United States Patent
Chen

(10) Patent No.: US 11,586,747 B2
(45) Date of Patent: Feb. 21, 2023

(54) METHOD FOR SETTING OPERATING RECORD VIEWING RIGHT BASED ON TIME PERIOD

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

(*) Notice: Subject to any disclaimer, the term of this patent is extended or adjusted under 35 U.S.C. 154(b) by 318 days.

(21) Appl. No.: 16/639,064

(22) PCT Filed: Aug. 13, 2018

(86) PCT No.: PCT/CN2018/100310
§ 371 (c)(1),
(2) Date: Feb. 13, 2020

(87) PCT Pub. No.: WO2019/034022
PCT Pub. Date: Feb. 21, 2019

(65) Prior Publication Data
US 2020/0202024 A1     Jun. 25, 2020

(30) Foreign Application Priority Data
Aug. 14, 2017   (CN) ................... 201710694053.1

(51) Int. Cl.
*H04L 9/40*         (2022.01)
*G06F 21/62*        (2013.01)
(Continued)

(52) U.S. Cl.
CPC ....... *G06F 21/6209* (2013.01); *G06Q 10/105* (2013.01); *G06Q 10/109* (2013.01);
(Continued)

(58) Field of Classification Search
CPC ............. G06F 21/6209; G06F 21/6218; G06F 2221/2137; G06F 2221/2141;
(Continued)

(56) References Cited

U.S. PATENT DOCUMENTS

2013/0104046 A1    4/2013   Casco-Arias Sanchez et al.
2015/0040234 A1*   2/2015   Grack .............. G06F 21/604
                                                    726/26

FOREIGN PATENT DOCUMENTS

CN    101510238 B   * 12/2011   ............. G06F 21/31
CN    103455763       12/2013
(Continued)

OTHER PUBLICATIONS

International Search Report in the international application No. PCT/CN2018/100310, dated Nov. 7, 2018.
(Continued)

*Primary Examiner* — Brian F Shaw
(74) *Attorney, Agent, or Firm* — Ladas & Parry, LLP

(57) ABSTRACT

A method for setting a permission to view an operation record based on a time range is disclosed in the present invention, including: selecting a grantee; setting one or more viewed objects for each grantee, wherein said grantee and said viewed object are the same type as a role, a user, and an employee; and setting a viewing-permission time range for each grantee, wherein said grantee obtains the permission to view the operation records of its corresponding viewed object within the viewing-permission time range of the grantee. In the present invention, the grantee can be authorized to view operation records of the viewed object within a certain time range according to actual requirements, and cannot view the operation records of the viewed object out of the time range, thus satisfying the requirement for viewing operation records of the viewed object in various time-limited cases, reducing the possibility that the operation records are known by irrelevant personnel, and improving information security of the company.

7 Claims, 3 Drawing Sheets

(51) Int. Cl.
*G06Q 10/105* (2023.01)
*G06Q 10/109* (2023.01)

(52) U.S. Cl.
CPC ............... *G06F 2221/2137* (2013.01); *G06F 2221/2141* (2013.01)

(58) Field of Classification Search
CPC .. G06Q 10/105; G06Q 10/109; H04L 63/101; H04L 63/102; H04L 63/105; H04L 63/108; H04L 41/28
See application file for complete search history.

(56) References Cited

FOREIGN PATENT DOCUMENTS

| CN | 103605916 A | 2/2014 |
|---|---|---|
| CN | 104050401 A | 9/2014 |
| CN | 104463005 | 3/2015 |
| CN | 104537488 | 4/2015 |
| CN | 104660599 | 5/2015 |
| CN | 105721487 | 6/2016 |
| CN | 105741084 | 7/2016 |
| CN | 106570406 A | 4/2017 |
| CN | 106934243 | 7/2017 |
| CN | 107370748 A | 11/2017 |

OTHER PUBLICATIONS

Written Opinion of the International Searching Authority in the international application No. PCT/CN2018/100310, dated Nov. 7, 2018 with English translation provided by Google Translate.
Notice of Allowance from Chinese Patent Application No. 201810918785.9 dated Jan. 11, 2022, and its English translation from Global Dossier.
Office Action from Chinese Patent Application No. 201810918785.9 dated Mar. 3, 2021 with search report, and its English translation from Global Dossier.
International Preliminary Report on Patentability (Chapter I) from PCT/CN2018/100310 dated Feb. 18, 2020.

* cited by examiner

METHOD FOR SETTING OPERATING RECORD VIEWING RIGHT BASED ON TIME PERIOD

CROSS-REFERENCE TO RELATED APPLICATIONS

This application is the U.S. national phase of PCT/CN2018/100310 filed on Aug. 13, 2018, which claims priority to Chinese Application No. 201710694053.1 filed on Aug. 14, 2017, the disclosures of which are incorporated by reference herein in their entireties.

BACKGROUND

Technical Field

The present invention relates to a method for authorizing a data-viewing permission in a management software system such as ERP, and in particular, to a method for setting a permission to view an operation record based on a time range.

Related Art

Role-based access control (RBAC) is one of the most researched and mature permission management mechanisms for databases in recent years. It is considered to be an ideal candidate to replace conventional mandatory access control (MAC) and discretionary access control (DAC). The basic idea of the role-based access control (RBAC) is to divide different roles according to different functional positions in the enterprise organization view, encapsulate the access permission of database resources in roles, and allow users to indirectly access the database resources by assigning different roles to the users.

A large number of tables and views are often built in large-scale application systems, which makes the permission management of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

However, the conventional role-based user permission management method adopts the "role-to-user one-to-many" relation mechanism, wherein the "role" has the nature of a group/a class. That is, one role can simultaneously correspond to/be related to multiple users, and the role is similar to a post/a position/a title/a type of work or other concepts. The permission authorization to a user under this relation mechanism is basically divided into the following three forms: 1. As shown in FIG. 1, the permission is directly authorized to the user, wherein the disadvantage is that the workload is large and the operation is frequent and cumbersome. 2. As shown in FIG. 2, the role (having the nature of a class/a group/a post/a title/a type of work) is authorized (one role may be related to multiple users), and the user obtains permissions through his/her role. 3. As shown in FIG. 3, the above two forms are combined.

In the above descriptions, as both form 2 and form 3 need to authorize the role that has the nature of a class/a group. The way of authorization through the role having the nature of a class/a group/a post/a type of work has the following disadvantages: 1. It is difficult to operate when the user's permission has changed. In the actual process of using a system, the user's permissions often need to be adjusted during the operation process. For example, in processing the change of employee's permissions, when the permissions of the employee related to the role have changed, it is improper to change the permissions of the entire role due to the change of the permissions of the individual employee, because this role is also related to other employees whose permissions remain unchanged. Therefore, to deal with this situation, either a new role is created to fit the employee whose permissions have changed, or permissions are directly authorized to the employee (disengaged from the role) based on permission requirements. The above two processing methods not only take a long time but also easily cause mistakes to authorize a role in the case of a large number of role permissions. It is cumbersome for a user to operate, and errors occur easily, resulting in loss to the system user.

2. It is difficult to remember the specific permissions contained in a role for a long time. If the role has many permission function points, as time goes by, it is difficult to remember the specific permissions of the role, and it is even more difficult to remember the permission differences between roles with similar permissions. If a new user needs to be related, it is impracticable to accurately determine how to select a relation.

3. Because user's permissions change, more roles will be created (if new roles are not created, the direct authorization to the user has to be greatly increased), and it is more difficult to distinguish specific differences between permissions of the roles.

4. When a user is transferred from a post, if many permissions of the transferred user need to be assigned to other users, it is necessary to distinguish the permissions of the transferred user and create roles to be related to the other users respectively during the processing. Such operations are not only complicated and time-consuming, but also prone to errors.

In the conventional management software system such as ERP, after an employee/a user obtains the permission to view his/her operation records, the employee/user can view all his/her operation records, but in some cases, it will cause information leakage of the company. For example, after Zhang San is transferred from the post of sales manager to the post of production supervisor, Zhang San, who has been transferred to the production supervisor, no longer needs to view the operation records of sales approval. However, because Zhang San has the permission to view his/her approval operation records, Zhang San can still view his/her previous approval operation records (such as approval records of sales contracts) that belong to the sales manager. In this case, the company fails to take effective restriction measures (if not authorized with the permission to view his/her approval operation records, Zhang San will fail to view his/her current approval operation records that belong to the sales supervisor, and as a result, Zhang San fails to work normally), thus leading to the data leakage of the company. For another example, when an employee A is temporarily transferred to investigate operation records within a certain time range of an employee B, the permission to view the operation records of the employee B needs to be authorized to the employee A. After obtaining the permission, the employee A can view all the operation records of the employee B, causing the leakage of other operation records in addition to the to-be-investigated operation records among all the operation records of the employee B. Therefore, it can be learned that the existing method for authorizing the permission to view operation records cannot achieve permission control effectively in some cases, which is adverse to the information security of the company and easily causes loss to the company.

The conventional method for authorizing the permission to view operation records fails to set a dynamic viewing-permission time range based on a mode/rule of "using a relation time of a role (grantee/viewed object) and its currently-related user as a reference time point". If the enterprise wants to set a viewing time range to authorize a role to view operation records of some roles by using the relation time as a reference time point, but the relation time is dynamic (many factors such as induction, transfer, and resignation of employees will change the role related to the corresponding user, and thus the relation time is uncertain), none of the conventional methods provides the solution of the time range with dynamic authorization. However, the method in the present application can perfectly solve such a problem.

SUMMARY

Technical Problems

The object of the present invention is to overcome the deficiencies of the prior art, and provide a method for setting a permission to view an operation record based on a time range.

Solutions to Problems

Technical Solutions

The object of the present invention is achieved by the following technical solutions: A method for setting a permission to view an operation record based on a time range includes: selecting a grantee; setting one or more viewed objects for each grantee, wherein said grantee and said viewed object are the same type as a role, a user, and an employee; and setting a viewing-permission time range for each grantee, wherein said grantee obtains a permission to view operation records of its corresponding viewed object within the viewing-permission time range of the grantee, wherein said viewing-permission time range includes one or more of the following five types: a time range from a time point, which is determined by going backwards from a current time for a fixed time length, to the current time, a time range from a start time to a current time, a time range from a deadline to a system initial time, a time range from a start time to a deadline, and a time range from a system initial time to a current time.

Preferably, when the grantee and the viewed object are both roles, the viewed object is the role serving as the grantee or one of all the roles except the role serving as the grantee; when the grantee and the viewed object are both users, the viewed object is the user serving as the grantee or one of all the users except the user serving as the grantee; and when the grantee and the viewed object are both employees, the viewed object is the employee serving as the grantee or one of all the employees except the employee serving as the grantee.

Preferably, said role is an independent individual not a group/a class, and during the same period, one role can only be related to a unique user, while one user is related to one or more roles; and the user obtains the permissions of the related role.

Preferably, when or after a role is created, a department is selected for the role, and therefore the role belongs to the department; the role is authorized according to the work content of the role, a name of the role is unique under the department, and a number of the role is unique in the system.

A method for setting a permission to view an operation record based on a time range includes: selecting a grantee; setting one or more viewed objects for each grantee, wherein said grantee and said viewed objects are the same type as a role, a user, and an employee; and setting a viewing-permission time range for each viewed object respectively, wherein said grantee obtains a permission to view operation records of each corresponding viewed object within the viewing-permission time range of each viewed object, wherein said viewing-permission time range includes one or more of the following five types: a time range from a time point, which is determined by going backwards from a current time for a fixed time length, to the current time, a time range from a start time to a current time, a time range from a deadline to a system initial time, a time range from a start time to a deadline, and a time range from a system initial time to a current time.

A method for setting a permission to view an operation record based on a time range includes: selecting a role as a grantee; setting one or more viewed objects for each grantee, wherein said viewed object is a role; and setting a viewing-permission time range for each grantee, wherein said grantee obtains a permission to view operation records of its corresponding viewed object within the viewing-permission time range of the grantee, wherein said permission time range includes one or more of the following four types: a time range from a time point, which is determined by going backwards from a relation time of the grantee and its currently-related user for a fixed time length, to a current time, a time range from a time point, which is determined by going forwards from a relation time of the grantee and its currently-related user for a fixed time length, to a system initial time, a time range from a relation time of the grantee and its currently-related user to a system initial time, and a time range from a relation time of the grantee and its currently-related user to a current time.

Preferably, said viewed object is the role serving as the grantee or one of all the roles except the role serving as the grantee.

Preferably, when a viewing-permission time range is set for each grantee, the relation time of the grantee and its currently-related user is displayed.

Preferably, said role is an independent individual not a group/a class, and during the same period, one role can only be related to a unique user, while one user is related to one or more roles; and the user obtains the permissions of the related role.

A method for setting a permission to view an operation record based on a time range includes: selecting a role as a grantee; setting one or more viewed objects for each grantee, wherein said viewed object is a role; and setting a viewing-permission time range for each viewed object respectively, wherein said grantee obtains a permission to view operation records of each corresponding viewed object within the viewing-permission time range of each viewed object, wherein said permission time range includes one or more of the following four types: a time range from a time point, which is determined by going backwards from a relation time of the viewed object and its currently-related user for a fixed time length, to a current time, a time range from a time point, which is determined by going forwards from a relation time of the viewed object and its currently-related user for a fixed time length, to a system initial time, a time range from a relation time of the viewed object and its currently-related user to a system initial time, and a time range from a relation time of the viewed object and its currently-related user to a current time.

Preferably, said role is an independent individual not a group/a class, and during the same period, one role can only be related to a unique user, while one user is related to one or more roles; and the user obtains the permissions of the related role.

Preferably, the role is in a one-to-one relation to a user (when the role is related to one user, other users can no longer be related to that role; and if the role is not related to the user, the role can be selected to be related to other users; that is, during the same period, one role can only be related to one user). A user is in a one-to-many relation to roles (one user can be related to multiple roles at the same time).

Preferably, the "relation time" in the "relation time of the grantee and its currently-related user" and the "relation time of the viewed object and its currently-related user" may be more than one (it is possible that the grantee has ever been related to its currently-related user, or it is possible that the viewed object has ever been related to its currently-related user), and then only the latest relation time is used automatically.

Beneficial Effects of the Invention

Beneficial Effects

The present invention has the following beneficial effects:
(1) In the present invention, a grantee can be authorized to view operation records of the viewed object within a certain time range according to actual requirements, and cannot view operation records of the viewed object out of the time range, thus satisfying the requirement for viewing the operation records of the viewed object in various time-limited cases, reducing the possibility that the operation records are known by irrelevant personnel, and improving information security of the company.

For example, if the role of sales manager 1 is only desired to view the operation records of the two roles after 2016: the viewing-permission time range of the sales manager 1 for the operation records of the salesperson 1 and the salesperson 2 may be set as from 2016 to the present (the viewing-permission time range is set for the sales manager 1, and then the sales manager 1 uses his/her own viewing-permission time range to view the operation records of the salesperson 1 and the salesperson 2 who serve as the viewed objects). If the role of internal auditor 1 is only desired to audit the operation records of the role of purchase manager 1 from May 2014 to May 2017, a start time and a deadline of the viewing-permission time range for the internal auditor 1 to view the operation records of the purchase manager 1 are set as May 2014 and May 2017 respectively (the viewing-permission time range is set for the internal auditor 1, and then the auditor 1 uses his/her own viewing-permission time range to view the operation records of the purchase manager 1 who serves as the viewed object).

For example, Zhang San is transferred from the post of sales manager to the post of production supervisor on May 1, 2016, the viewing-permission time range for Zhang San to view his/her own operation records may be set as from May 1, 2016 to the present, so that after being transferred, Zhang San cannot view his/her approval operation records with the post of the sales manager (before May 1, 2016), but can view his/her operation records with the post of the sales supervisor after May 1, 2016. Therefore, Zhang San can work normally while the information security of the company is ensured.

(2) In the present invention, the time range can be set based on the relation time of the role and its currently-related user, so that the operation records of a historically-related user of the role can be quickly distinguished from the operation records of the currently-related user of the role.

For example, for the role of financial manager 1, if each user (current user) related to the financial manager 1 is only desired to view his/her own operation records, the viewing-permission time range of the financial manager 1 for its own operation records may be set as from a relation time of the financial manager 1 and its currently-related user to the present.

The method in the present invention can set a dynamic viewing-permission time range in the mode of "using a relation time of a role (grantee/viewed object) and its currently-related user as a reference time point, which is more beneficial to refine the management of enterprise.

(3) When a viewing-permission time range is set for each grantee/viewed object, the relation time of the grantee/viewed object and its currently-related user is displayed, so that an authorization operator can quickly and accurately know the relation time of the grantee/viewed object and its currently-related user, thus improving the authorization accuracy and authorization speed.

(4) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of an employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also easily cause mistakes to authorize a role in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the efficiency of the permission management for the system user in using the system, make the dynamic authorization simpler, more convenient, clearer and more explicit, and improve the efficiency and reliability of the permission setting.

(5) The conventional group-based role authorization method is prone to errors. The method provided in the present application significantly reduces the probability of authorization errors, because the method of the present application only needs to consider the role as an independent individual, without considering the commonality of multiple users related to the role having the nature of a group under the conventional method. Even if errors occur in authorization, only the user related to the role is affected. However, in the case of the conventional role having the nature of a group, all users related to the role are affected. Even if errors occur in authorization, the correction method in the present application is simple and takes a short time, while in the case of the conventional role having the nature of a group, the commonality of the permissions of all users related to the role needs to be considered during correcting the errors. The modification is cumbersome, complex, and error-prone when there are many function points, and in many cases, the problem cannot be solved unless a new role is created.

(6) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(7) When a user is transferred from a post, if many permissions of the transferred user need to be assigned to other users, in processing, it is necessary to distinguish the permissions of the transferred user and create roles to relate to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

(8) A department needs to be selected when or after a role is created. After the role belongs to the department, the department cannot be replaced. Reasons why the department to which the role belongs cannot be replaced are as follows: Reason 1: As the role in the present application is equivalent to a station number or a post number in nature, different station numbers or post numbers have different work content or permissions. For example, the role of a salesperson 1 under a sales department and the role of a developer 1 under a technical department are two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Description of the Drawings

Figure 1:
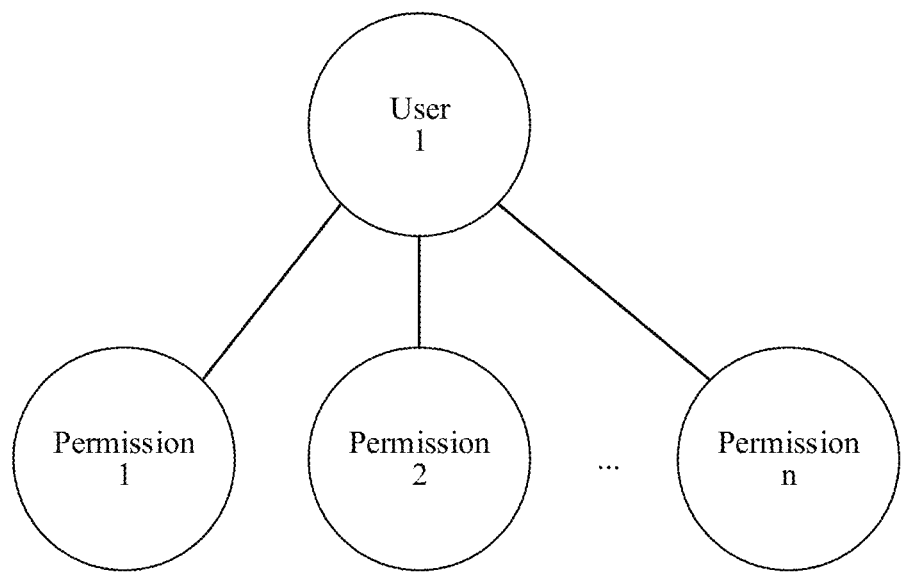
Figure 2:
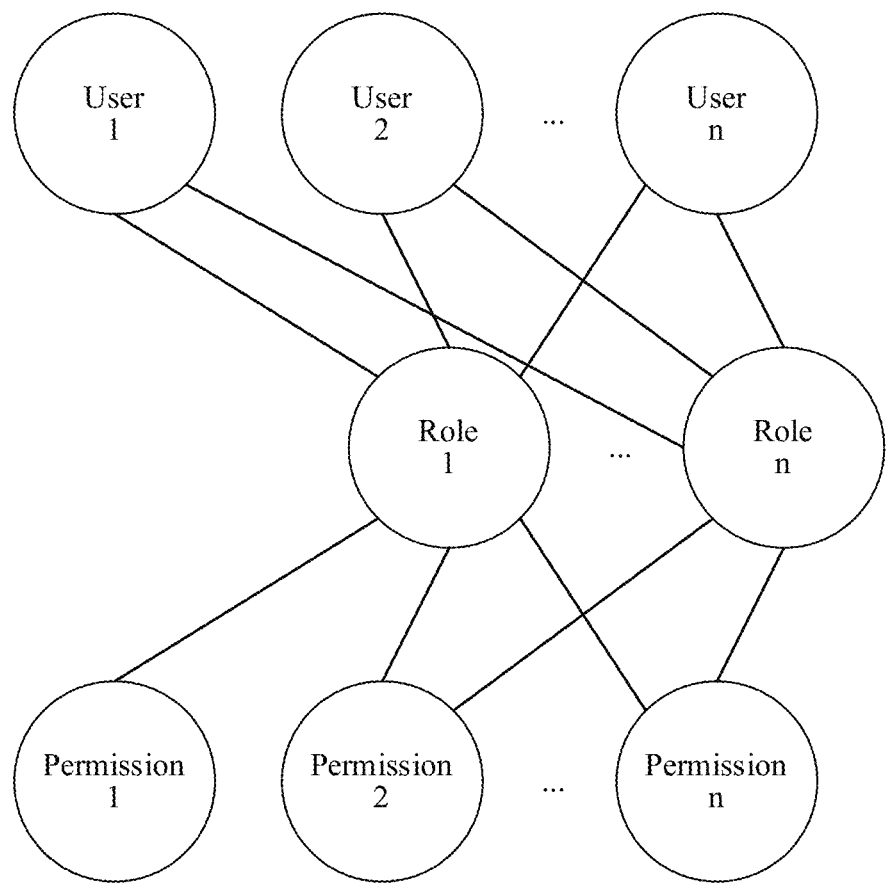
Figure 3:
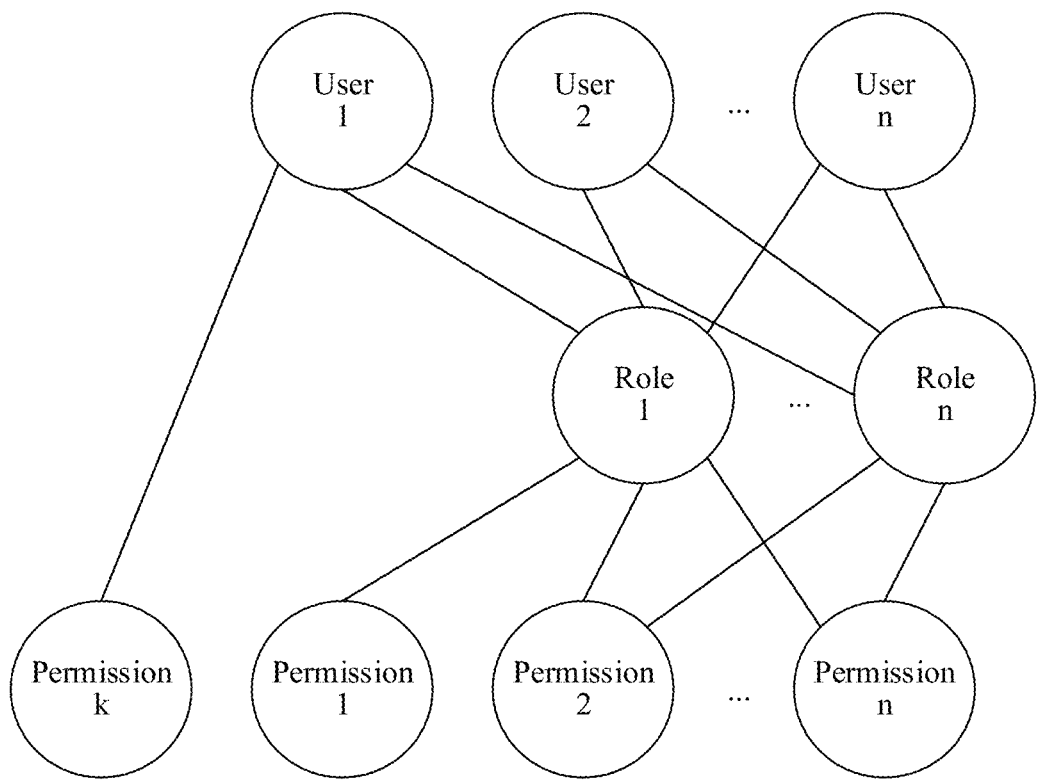
Figure 4:
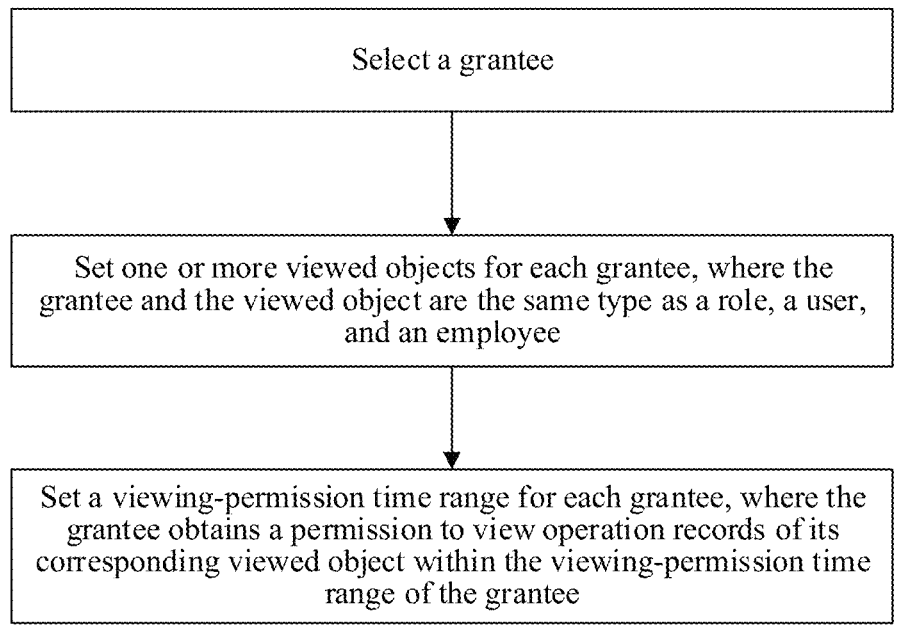
Figure 5:
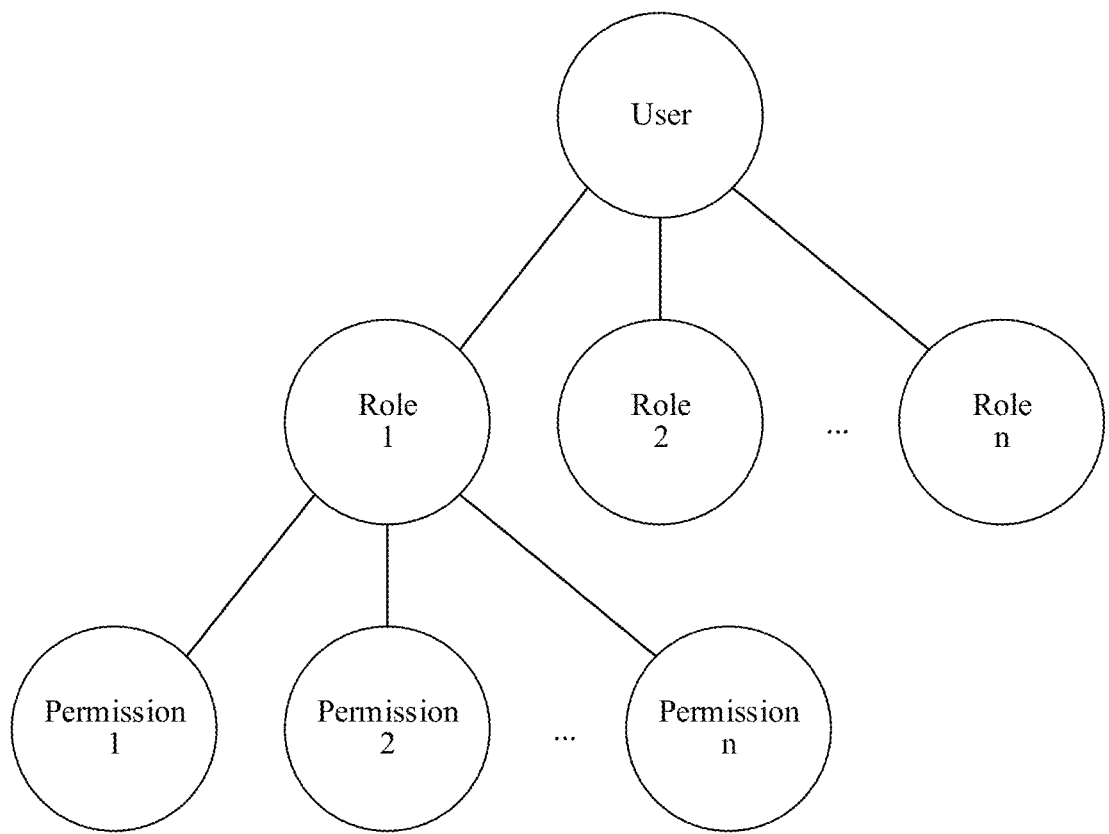
Figure 6:
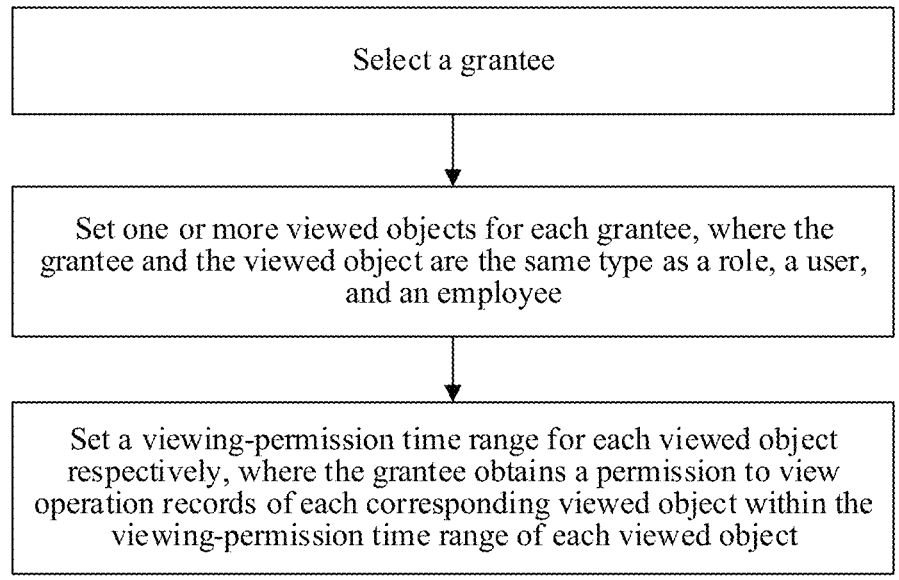

FIG. 1 is a schematic diagram of directly authorizing a user in the prior art;

FIG. 2 is a schematic diagram of authorizing a role having the nature of a group/a class in the prior art;

FIG. 3 is a schematic diagram of both directly authorizing a user and a role having the nature of a group/a class in the prior art;

FIG. 4 is a flowchart of an embodiment of the present invention;

FIG. 5 is a schematic diagram of authorizing a user through a role having the nature of an independent individual in the present invention; and FIG. 6 is a flowchart of another embodiment of the present invention.

OPTIMAL EMBODIMENTS FOR IMPLEMENTING THE INVENTION

Optimal Embodiments of the Invention

The technical solutions of the present invention will be further described in detail below with reference to the figures, but the protection scope of the present invention is not limited to the following descriptions.

[Embodiment 1] As shown in FIG. 4, the method for setting a permission to view an operation record based on a time range includes the following steps:

S11: Selecting the grantee.

S12: Setting one or more viewed objects for each grantee.

The grantee and the viewed object are the same type as a role, a user, and an employee; that is, when the grantee is a role, the viewed object is also a role; when the grantee is a user, the viewed object is also a user; and when the grantee is an employee, the viewed object is also an employee.

As shown in FIG. 5, the role is an independent individual not a group/a class, and during the same period, one role can only be related to a unique user, while one user is related to one or more roles. The user obtains the permissions of the related role. When or after the role is created, the department is selected for the role, and therefore the role belongs to the department. The role is authorized according to the work content of the role, the name of the role is unique under the department, and the number of the role is unique in the system.

Definition of a role: A role does not have the nature of a group/a class/a category/a post/a position/a title/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a title/a type of work in nature, and one role can correspond to multiple users. However, in the present application, the concept of "role" (the role having the nature of an independent individual) is equivalent to a post number/a station number, and is also similar to the role in a film and television drama: one role (in childhood, juvenile, middle-age . . . ) can be played by only one actor or actress during the same period, but one actor or actress may play multiple roles.

When the user is transferred from a post, the user's relation to the original role is canceled, and the user is related to the new role. Then, the role automatically loses the permissions of the original role, and automatically obtains the permissions of the new role; that is, the user obtains the permissions of the related role.

When the employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After the role is created, the user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) the permissions through a role related to his/her corresponding user.

Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

When the grantee and the viewed object are both roles, the viewed object is the role serving as the grantee or one of all the roles except the role serving as the grantee; when the grantee and the viewed object are both users, the viewed object is the user serving as the grantee or one of all the users except the user serving as the grantee; and when the grantee and the viewed object are both employees, the viewed object is the employee serving as the grantee or one of all the employees except the employee serving as the grantee. That is, the time range can be set for the grantee (role/user/employee) to view the operation records of other roles/users/employees, and the time range can be set for the grantee to view its own operation records as well.

S13: Setting the viewing-permission time range for each grantee, wherein the grantee obtains the permission to view the operation records of its corresponding viewed object within the viewing-permission time range of the grantee.

The viewing-permission time range includes one or more of the following five types: a time range from a time point, which is determined by going backwards from a current time for a fixed time length, to the current time (the current time is dynamic), a time range from a start time to a current time, a time range from a deadline to a system initial time, a time range from a start time to a deadline, and a time range from a system initial time to a current time.

The unit for setting the viewing-permission time range may be year, month, day, hour, minute, second, and the like.

The above five types of time ranges are described below by examples: the time range from a time point, which is determined by going backwards from a current time for a fixed time length, to the current time. For example, on Jun. 20, 2017, a role 1 (grantee) is authorized to view the operation records of a role 2 (viewed object) within a time range from a time point, which is determined by going backwards 6 days from Jun. 20, 2017, to Jun. 20, 2017 (which is the current time, but not a specific time point). That is, on Jun. 20, 2017, the role 1 can view the operation records of the role 2 from Jun. 15, 2017 to Jun. 20, 2017; on Jun. 21, 2017, the employee A can view the operation records of the role 2 from Jun. 16, 2017 to Jun. 21, 2017; on Jun. 22, 2017, the employee A can the view operation records of the role 2 from Jun. 17, 2017 to Jun. 22, 2017, and so on. That is, the time length of the time range is fixed, while the start time and the deadline are both variable.

The time range from a start time to a current time (the current time is dynamic). For example, on May 1, 2015, the role 1 (grantee) is authorized to view the operation records of the role 2 (viewed object) from Feb. 1, 2015 to the current date (current time). Then, the role 1 can view the operation records of the role 2 from Feb. 1, 2015 to May 1, 2015; on May 2, 2015, the role 1 can view the operation records of the role 2 from Feb. 1, 2015 to May 2, 2015 (further, the start time can be defined as excluding the start time, and when the start time is excluded, the role 1 cannot view operation records of the role 2 on Feb. 1, 2015, but can only view the operation records of the role 2 after Feb. 1, 2015).

The time range from a deadline to a system initial time. For example, the role 1 (grantee) is authorized to view operation records of the role 2 (viewed object) from Feb. 1, 2015 to the system initial time. Then, the role 1 can view the operation records of the role 2 from Feb. 1, 2015 to the system initial time (that is, the role 1 can view the operation records of the role 2 on and before Feb. 1, 2015); (further, the deadline can be defined as excluding the deadline, and when the deadline is excluded, the role 1 cannot view the operation records of the role 2 on Feb. 1, 2015, but can only the view operation records of the role 2 before Feb. 1, 2015; furthermore, the system initial time may not be set and only the deadline is set, and in this case, the role 1 can the view operation records of the role 2 on and before the deadline, or the role 1 can the view operation records of the role 2 before the deadline).

The time range from a start time to a deadline. For example, the role 1 (grantee) is authorized to view the operation records of the role 2 (viewed object) from Feb. 1, 2015 to Jun. 1, 2015. Then, the role 1 can the operation records of the role 2 from Feb. 1, 2015 to Jun. 1, 2015.

The time range from a system initial time to a current time (the current time is dynamic). For example, on Jun. 1, 2017, the role 1 (grantee) is authorized to view the operation records of the role 2 (viewed object) from the system initial time to the current time. Then, on Jun. 1, 2017, the role 1 can view the operation records of the role 2 from the system initial time to Jun. 1, 2017; on Jun. 2, 2017, the role 1 can view the operation records of the role 2 from the system initial time to Jun. 2, 2017, and so on.

Both the deadline and the start time are set manually.

[Embodiment 2] As shown in FIG. 6, a method for setting a permission to view an operation record based on a time range includes the following steps, S21: Selecting the grantee.

S22: Setting one or more viewed objects for each grantee.

The grantee and the viewed object are the same type as a role, a user, and an employee; that is, when the grantee is a role, the viewed object is also a role; when the grantee is a user, the viewed object is also a user; and when the grantee is an employee, the viewed object is also an employee.

The role is an independent individual not a group/a class, and during the same period, one role can only be related to a unique user, while one user is related to one or more roles. The user obtains the permissions of the related role. When or after the role (a role having the nature of an independent individual) is created, the department is selected for the role, and therefore the role belongs to the department. The role is authorized according to the work content of the role, the name of the role is unique under the department, and the number of the role is unique in the system.

When the user is transferred from a post, the user's relation to the original role is canceled, and the user is related to the new role. Then, the role automatically loses the permissions of the original role, and automatically obtains the permissions of the new role; that is, the user obtains the permissions of the related role.

When the employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After the role is created, the user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) the permissions through a role related to his/her corresponding user.

Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

When the viewed object is a role, the viewed object is the role serving as the grantee or one of all the roles except the role serving as the grantee.

When the grantee and the viewed object are both roles, the viewed object is the role serving as the grantee or one of all the roles except the role serving as the grantee; when the grantee and the viewed object are both users, the viewed object is the user serving as the grantee or one of all the users except the user serving as the grantee; and when the grantee and the viewed object are both employees, the viewed object is the employee serving as the grantee or one of all the employees except the employee serving as the grantee. That is, the time range can be set for the grantee (role/user/employee) to view the operation records of other roles/users/employees, and the time range can be set for the grantee to view its own operation records as well.

S23: Setting the viewing-permission time range for each viewed object respectively, wherein the grantee obtains the permission to view operation records of each corresponding viewed object within the viewing-permission time range of each viewed object The viewing-permission time range includes one or more of the following five types: a time range from a time point, which is determined by going backwards from a current time for a fixed time length, to the current time, a time range from a start time to a current time, a time range from a deadline to a system initial time, a time range from a start time to a deadline, and a time range from a system initial time to a current time.

The unit for setting the viewing-permission time range may be year, month, day, hour, minute, second, and the like.

Both the deadline and the start time are set manually.

[Embodiment 3] A method for setting a permission to view an operation record based on a time range includes the following steps, S31: Selecting the role as the grantee.

The role is an independent individual not a group/a class, and during the same period, one role can only be related to a unique user, while one user is related to one or more roles. The user obtains the permissions of the related role. When or after the role (a role having the nature of an independent individual) is created, the department is selected for the role, and therefore the role belongs to the department. The role is authorized according to the work content of the role, the name of the role is unique under the department, and the number of the role is unique in the system.

When the user is transferred from a post, the user's relation to the original role is canceled, and the user is related to the new role. Then, the role automatically loses the permissions of the original role, and automatically obtains the permissions of the new role; that is, the user obtains the permissions of the related role.

When the employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After the role is created, the user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) the permissions through a role related to his/her corresponding user.

Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

S32: Setting one or more viewed objects for each grantee, wherein the viewed object is a role.

The viewed object is the role serving as the grantee or one of all the roles except the role serving as the grantee.

S33: Setting the viewing-permission time range for each grantee, wherein the grantee obtains the permission to view operation records of its corresponding viewed object within the viewing-permission time range of the grantee When the viewing-permission time range is set for each grantee, the relation time of the grantee and its currently-related user is displayed.

The permission time range includes one or more of the following four types: a time range from a time point, which is determined by going backwards from a relation time of the grantee and its currently-related user for a fixed time length, to a current time, a time range from a time point, which is determined by going forwards from a relation time of the grantee and its currently-related user for a fixed time length, to a system initial time, a time range from a relation time of the grantee and its currently-related user to a system initial time, and a time range from a relation time of the grantee and its currently-related user to a current time.

The above four types of time ranges are described below by examples: the time range from a time point, which is determined by going backwards from a relation time of the grantee and its currently-related user for a fixed time length, to a current time. For example, a relation time of a role 1 and its currently-related user is May 1, 2016, and the time range of the permission for the role 1 to view the operation records of a role 2 is set to a time range from a time point, which is determined by going backwards from the relation time of the role 1 and its currently-related user for two months, to the current time. In this case, the role 1 can view all operation records after Mar. 1, 2016 of the role 2.

The time range from a time point, which is determined by going forwards from the relation time of the grantee and its currently-related user for a fixed time length, to the system initial time. For example, the relation time of the role 1 and its currently-related user is May 1, 2016, and the time range of the permission for the role 1 to view the operation records of the role 2 is set as the time range from a time point, which is determined by going forwards from the relation time of the role 1 and its currently-related user for two months, to the system initial time. In this case, the role 1 can view all operation records before Jul. 1, 2016 of the role 2.

The time range from a relation time of the grantee and its currently-related user to the system initial time. For example, the relation time of the role 1 and its currently-related user is May 1, 2016, and the time range of the permission for the role 1 to view the operation records of the role 2 is set as the time range from the relation time of the role 1 and its currently-related user to the system initial time. In this case, the role 1 can view all operation records before May 1, 2016 of the role 2.

The time range from the relation time of the grantee and its currently-related user to the current time. For example, the relation time of the role 1 and its currently-related user is May 1, 2016, and the time range of the permission for the role 1 to view the operation records of the role 2 is set as the time range from the relation time of the role 1 and its currently-related user to the current time. In this case, the role 1 can view all operation records after May 1, 2016 of the role 2. For another example, the relation time of the role 1 and its currently-related user is May 1, 2016, and the time range of the permission for the role 1 (grantee) to view the operation records of the role 1 (viewed objects, that is, the viewed object is the grantee itself) is set as the time range from the relation time of the role 1 and its currently-related user to the current time. In this case, the role 1 can view all operation records after May 1, 2016 of the role 1.

The unit for setting the viewing-permission time range may be year, month, day, hour, minute, second, and the like.

[Embodiment 4] A method for setting a permission to view an operation record based on a time range includes the following steps, S41: Selecting the role as the grantee.

The role is an independent individual not a group/a class, and during the same period, one role can only be related to a unique user, while one user is related to one or more roles. The user obtains the permissions of the related role. When or after the role is created, the department is selected for the role, and therefore the role belongs to the department. The role is authorized according to the work content of the role, the name of the role is unique under the department, and the number of the role is unique in the system.

When the user is transferred from a post, the user's relation to the original role is canceled, and the user is related to the new role. Then, the role automatically loses the permissions of the original role, and automatically obtains the permissions of the new role; that is, the user obtains the permissions of the related role.

When the employee is recruited, after the role is related to the user corresponding to the employee, the user automatically obtains the permissions of the related role. When the employee resigns, after the relation between the user corresponding to the employee and the role related to the user is canceled, the user automatically loses the permissions of the original related role.

After the role (the role having the nature of an independent individual) is created, the user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and the employee determines (obtains) the permissions through a role related to his/her corresponding user.

Further, the employee and the user are bound permanently. After the user corresponds to the employee, the user belongs to the employee, and the user can no longer be related to other employees. If the employee resigns, the user cannot correspond to other employees. After the employee is recruited again, the employee still uses the original user.

S42: Setting one or more viewed objects for each grantee, wherein the viewed object is a role.

The viewed object is the role serving as the grantee or one of all the roles except the role serving as the grantee.

S43: Setting the viewing-permission time range for each viewed object, wherein the grantee obtains the permission to view the operation records of each corresponding viewed object within the viewing-permission time range of each viewed object.

When the viewing-permission time range is set for each grantee respectively, the relation time of the viewed object and its currently-related user is displayed.

The permission time range includes one or more of the following four types: a time range from a time point, which is determined by going backwards from a relation time of the viewed object and its currently-related user for a fixed time length, to a current time, a time range from a time point, which is determined by going forwards from a relation time of the viewed object and its currently-related user for a fixed time length, to a system initial time, a time range from a relation time of the viewed object and its currently-related user to a system initial time, and a time range from a relation time of the viewed object and its currently-related user to a current time.

The unit for setting the viewing-permission time range may be year, month, day, hour, minute, second, and the like.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for setting a permission to view an operation record based on a time range, comprising:
   selecting a grantee;
   setting one or more objects for the grantee, wherein the grantee and the one or more objects are a same type being a role, a user, or an employee; and
   setting a viewing-permission time range for the grantee, wherein the grantee is configured to obtain a permission to view an operation record of a corresponding object within the viewing-permission time range for the grantee;
   wherein the viewing-permission time range comprises one or more of the following: a time range from a time point, which is determined by going backwards from a current time for a fixed time length, to the current time, a time range from a start time to a current time, a time range from a deadline to a system initial time, a time range from a start time to a deadline, and a time range from a system initial time to a current time;
   wherein when or after a role is created, a department is selected for the role, and the role is configured to belong to the department; the role is authorized according to a work content of the role, a name of the role is unique under the department, and a number of the role is unique in the system;
   wherein said role is an independent object which is not a group or a class, and during a same period, said role is configured to be related to the user only, while the user is related to the role; and the user is configured to obtain the permission to view the operation record based on said role and said viewing-permission time range.

2. The method according to claim 1, wherein when the grantee and the object are both roles, the object is the role serving as the grantee or one of all roles except the role serving as the grantee;
   when the grantee and the object are both users, the object is a user serving as the grantee or one of all users except the user serving as the grantee; and
   when the grantee and the object are both employees, the viewed object is an employee serving as the grantee or one of all employees except the employee serving as the grantee.

3. A method for setting a permission to view an operation record based on a time range, comprising: selecting a grantee; setting one or more objects for the grantee, wherein the grantee and the one or more objects are a same type as-being a role, a user, or an employee; and setting a viewing-permission time range for each of the one or more objects, wherein the grantee is configured to obtain a permission to view an operation record of each corresponding object within the viewing-permission time range for each of the one or more objects; wherein the viewing-permission time range comprises one or more of the following: a time range from a time point, which is determined by going backwards from a current time for a fixed time length, to the current time, a time range from a start time to a current time, a time range from a deadline to a system initial time, a time range from a start time to a deadline, and a time range from a system initial time to a current time, wherein when or after a role is created, a department is selected for the role, and the role is configured to belong to the department; the role is authorized according to a work content of the role, a name of the role is unique under the department, and a number of the role is unique in the system;
wherein said role is an independent object which is not a group or a class, and during a same period, said role is configured to be related to the user only, while the user is related to the role; and the user is configured to obtain the permission to view the operation record based on said role and said viewing-permission time range.

4. A method for setting a permission to view an operation record based on a time range, comprising: selecting a role as a grantee; setting one or more objects for the grantee, wherein each of the one or more objects is a role; and setting a viewing-permission time range for the grantee, wherein the grantee is configured to obtain a permission to view an operation record of a corresponding object within the viewing-permission time range for the grantee; wherein the viewing-permission time range comprises one or more of the following: a time range from a time point, which is determined by going backwards from a relation time of the grantee and its currently-related user for a fixed time length, to a current time, a time range from a time point, which is determined by going forwards from a relation time of the grantee and its currently-related user for a fixed time length, to a system initial time, a time range from a relation time of the grantee and its currently-related user to a system initial time, and a time range from a relation time of the grantee and its currently-related user to a current time, wherein when or after a role is created, a department is selected for the role, and the role is configured to belong to the department; the role is authorized according to a work content of the role, a name of the role is unique under the department, and a number of the role is unique in the system;
wherein said role is an independent object which is not a group or a class, and during a same period, said role is configured to be related to the user only, while the user is related to the role; and the user is configured to obtain the permission to view the operation record based on said role and said viewing-permission time range.

5. The method according to claim 4, wherein said object is a role serving as the grantee or one of all roles except the role serving as the grantee.

6. The method according to claim 4, wherein when a viewing-permission time range is set for the grantee, the relation time of the grantee and its currently-related user is displayed.

7. A method for setting a permission to view an operation record based on a time range, comprising: selecting a role as a grantee; setting one or more objects for the grantee, wherein each of the one or more objects is a role; and setting a viewing-permission time range for each of the one or more objects, wherein the grantee is configured to obtain a permission to view an operation record of a corresponding object within the viewing-permission time range for each of the one or more objects; wherein the viewing-permission time range comprises one or more of the following: a time range from a time point, which is determined by going backwards from a relation time of the viewed object and its currently-related user for a fixed time length, to a current time, a time range from a time point, which is determined by going forwards from a relation time of the viewed object and its currently-related user for a fixed time length, to a system initial time, a time range from a relation time of the viewed object and its currently-related user to a system initial time, and a time range from a relation time of the viewed object and its currently-related user to a current time, wherein when or after a role is created, a department is selected for the role, and the role is configured to belong to the department; the role is authorized according to a work content of the role, a name of the role is unique under the department, and a number of the role is unique in the system;

wherein said role is an independent object which is not a group or a class, and during a same period, said role is configured to be related to the user only, while the user is related to the role; and the user is configured to obtain the permission to view the operation record based on said role and said viewing-permission time range.

* * * * *